United States Patent
Ghelmansarai

(10) Patent No.: US 8,712,014 B2
(45) Date of Patent: Apr. 29, 2014

(54) ADAPTIVE FRAME SCANNING SCHEME FOR PULSED X-RAY IMAGING

(75) Inventor: Farhad Ghelmansarai, Danville, CA (US)

(73) Assignee: PerkinElmer Holdings, Inc., Waltham, MA (US)

( * ) Notice: Subject to any disclaimer, the term of this patent is extended or adjusted under 35 U.S.C. 154(b) by 938 days.

(21) Appl. No.: 12/850,524

(22) Filed: Aug. 4, 2010

(65) Prior Publication Data

US 2012/0033793 A1    Feb. 9, 2012

(51) Int. Cl.
    *H05G 1/64*        (2006.01)
(52) U.S. Cl.
    USPC .......................... 378/98.8; 378/116
(58) Field of Classification Search
    USPC .................................. 378/98.8, 116
    See application file for complete search history.

(56) References Cited

U.S. PATENT DOCUMENTS

| 6,330,303 | B1 | 12/2001 | Yamane et al. |
| 7,027,558 | B2 | 4/2006 | Ghelmansarai et al. |
| 7,076,023 | B2 | 7/2006 | Ghelmansarai et al. |
| 2004/0247079 | A1 | 12/2004 | Endo |
| 2005/0088566 | A1* | 4/2005 | Tamura et al. ............ 348/362 |

FOREIGN PATENT DOCUMENTS

WO    2007/043487 A1    4/2007

OTHER PUBLICATIONS

International Preliminary Report on Patentability received for PCT Patent Application No. PCT/US2011/045567, mailed on Feb. 14, 2013, 7 pages.
International Search Report and Written Opinion received for PCT Patent Application No. PCT/US2011/045567, mailed on Nov. 10, 2011, 10 pages.

* cited by examiner

*Primary Examiner* — Hoon Song
(74) *Attorney, Agent, or Firm* — Morrison & Foerster LLP

(57) ABSTRACT

A method for adaptive frame scanning for pulsed x-ray imaging comprising the steps of: scanning lines on an image detector sequentially; receiving an indication that radiation is about to begin; waiting a fixed delay after the indication is received; suspending scanning after the fixed delay has lapsed; and resuming scanning of lines on the detector upon receiving an indication that radiation has stopped. By monitoring for completion of a frame a predetermined frame delay can be added before commencing the next line scan to accommodate jitter in the radiation pulse timing.

16 Claims, 5 Drawing Sheets

ADAPTIVE FRAME SCANNING SCHEME FOR PULSED X-RAY IMAGING

BACKGROUND OF THE INVENTION

1. Field of the Invention

This invention relates generally to the field of X-ray imaging detectors and more particularly to a system and method for controlling frame scanning to avoid artifacts created by X-ray pulses during the imaging process.

2. Description of the Prior Art

Photosensitive element arrays for converting incident radiant energy into an electrical signal are commonly used in imaging applications, for example, in x-ray imagers and facsimile device arrays. Real time and continuous image acquisitions of pulsed X-ray imaging systems are required in many applications. These applications include high energy X-ray (therapy), medium energy (industrial), or low X-ray energy (diagnostics). For Megavoltage (MV) imaging the pulsing period is normally small compared to detector frame scan time and pulsing artifacts of the linear accelerator are often present in current imaging systems. For pulsed KV X-ray the period of exposure is normally longer than frame scan time, however, there is often a significant uttering in KV beam pulses that makes the offset calibration very difficult and inaccurate if a frame synchronization scheme is used after radiation delivery. This makes the frame overhead time longer if the radiation delivered during the frame delay time.

Cone beam (CB) or even fan beam Computed Tomography (CT) image acquisition also often uses pulsed X-ray generation. The current technique mainly used for CBCT with pulsed X-ray is based on frame synchronization, i.e. radiation delivered for each specific angle and the frame readout occurs after radiation delivery. In this mode the detector is controlled externally and frame scan is synchronized with the radiation on or off signal of X-ray source. There are some problems with this technique. Frame synchronization does not work when the beam pulsing frequency is greater than the frame scan rate (or in other words, the timing period between two pulses is smaller than frame scan time) and when pulsing frequency varies during radiation. Frame integration time is equal to the sum of beam on time, frame scan time, and wait time until next radiation pulse occurs. Therefore, the frame integration time will be longer and dark current shot noise will be greater for longer frame integration time. Due to the jittering of the delivered radiation pulses which sometimes is not avoidable (for instance if the gantry angle controls the shooting of the X-ray exposure), the dark offset correction will not be optimum and this will cause artifacts in the reconstructed CT images and limit low dose applications.

It is therefore desirable to provide a system and method for frame scanning control for flat panel imagers that are optimized for pulsed x-ray imaging by capitalizing on the adaptive nature of frame scan. It is also desirable that the system provide a control scheme for detector line scan with dependency on the X-ray control signals.

BRIEF SUMMARY OF THE INVENTION

The present systems and methods include a method for adaptive frame scanning for pulsed x-ray imaging wherein lines on an image detector are scanned sequentially and upon receiving an indication that radiation is about to begin for an X-ray source in a scan control generator a delay is calculated and scanning is suspended until the end of the calculated delay. Upon receiving an indication that radiation has stopped scanning of lines on the detector is resumed.

In certain embodiments, the step of calculating the delay is accomplished by providing for suspending scanning for a duration substantially equivalent to at least one scan line time prior to receiving an indication that radiation has begun. Additional embodiments of the method provide for monitoring for completion of a frame and adding a predetermined frame delay upon completion of a frame before commencing the next line scan. The predetermined frame delay is calculated to accommodate jitter in actual radiation-on times to obtain a fixed frame rate.

For gain calibration, the method provides for sensing gain calibration and employing frame scans from the beginning of radiation to the end of radiation plus a post-frame after elapse of radiation gain correction by an analysis system.

Similarly for use of Cine imaging, the method provides for sensing Cine imaging and employing frame scans from the beginning of radiation to the end of radiation plus a post-frame after elapse of radiation gain for image generation.

An exemplary embodiment also provides for operating the detector in an alternate mode, monitoring switching of the X-ray source from standby to "on" mode and resetting the control scan generator to stop line scanning at least one frame prior to the delay from the indication that radiation is about to begin. The on mode is determined by the control scan generator responsive to a flag from the X-ray generator that radiation is imminent.

A exemplary embodiment of a system for control of an X-ray image detector incorporates an x-ray source and a signal generator connected to the X-ray source and capable of providing a first signal indicating that radiation is about to begin and a second signal that radiation has stopped. A detector frame scan signal generator is provided which is capable of receiving the first and second signals from the signal generator, calculating a delay responsive to the first signal, providing a first control signal to suspend line scanning responsive to the delay, and providing a second control signal to activate line scanning responsive to the second signal from the signal generator. In certain embodiments the detector frame scan signal generator provides a control signal to suspend line scanning substantially equal to at least one scan line time prior to receiving an indication that radiation will begin. In yet other embodiments, the detector frame scan signal generator is capable of monitoring for completion of a frame and provide a third control signal to activate line scanning for adding a predetermined frame delay upon completion of a frame before commencing the next line scan. The predetermined frame delay is calculated to accommodate jitter in actual radiation on times to obtain a fixed frame rate.

For embodiments where the X-ray image detector is capable of operating in an alternate mode, the detector frame scan signal generator is further capable of monitoring switching of the X-ray source from standby to "on" mode; and resetting to stop line scanning at least one frame prior to the delay from the pre-radiation on pulse. The on mode is determined by the detector scan signal generator responsive to an active signal generated by the signal generator associated with the X-ray source.

BRIEF DESCRIPTION OF THE DRAWINGS

These and other features and advantages of the present invention will be better understood by reference to the following detailed description when considered in connection with the accompanying drawings wherein.

DETAILED DESCRIPTION OF THE INVENTION

Figure 1:
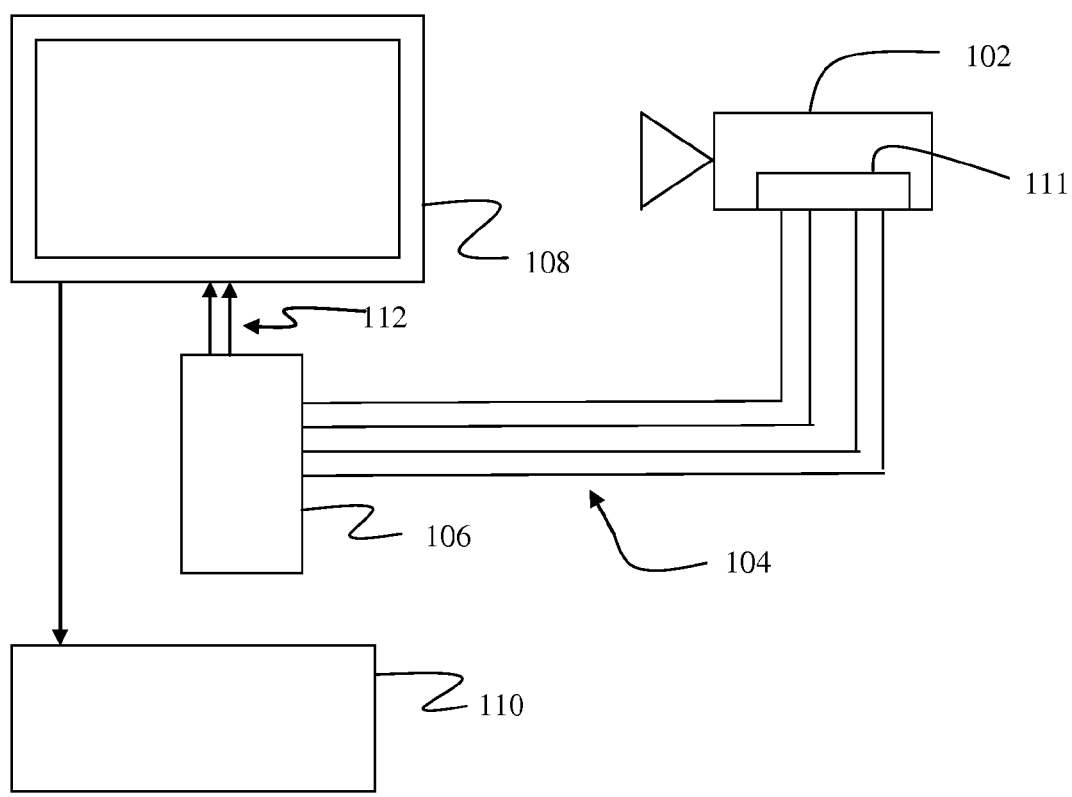
FIG. 1 is a block diagram of the elements of an X-ray system in which the present invention is incorporated.

An exemplary X-ray imaging system is shown in FIG. 1. An X-ray source 102 provides control signals 104 to detector external interface circuitry represented by frame scan control generator 106 to control the frame scan and readout of an X-ray detector 108. Detector output is connected to an analysis system, which in some embodiments includes one or more computers or microprocessors 110. Detector frame scanning is based on line triggering from the frame scan control generator which allows external triggering from the signal generator 111 associated with the x-ray source to control the line readout and turn it on or off with various control signals 112 to be described in greater detail subsequently. For an exemplary embodiment, a "High" status of an external trigger enables the detector to continuously read scan lines and a "Low" status of the external trigger disables the scan readout and puts the detector at hold or idle status. Input signals to the detector frame scan control generator available from the signal generator are the pre-radiation-on pulse, the radiation on pulse, and a radiation-off pulse which is activated when the X-ray pulse switches from on to off. The output of the detector frame scan control generator is a Detector Line Scan Trigger (DLST) providing the high and low external trigger for the detector.

X-ray imagers of a type employed with systems incorporating the present invention may be formed on a substantially flat substrate, typically glass. The imager includes an array of pixels with light-sensitive imaging elements, typically photodiodes, each of which has an associated switching element, such as a thin film transistor (TFT) or one or more additional addressing diodes. In conjunction with a scintillator, x-rays are transformed into visible light for imaging with the photosensitive elements. The photosensitive elements, typically photodiodes, are connected at one surface to a switching device, typically a TFT, and at the other surface to a common electrode which contacts all the photodiodes in parallel. The array is addressed by a plurality of row and column address lines. In operation to conduct a frame scan, the voltage on the row lines, and hence the TFTs, are switched on in turn, allowing the charge on that scanned line's photodiodes to be read out via the column address lines, which are connected to external amplifiers. The row address lines are commonly referred to as "scan lines" and the column address lines are referred to as "data lines" which are connected to external scan line drive and data line read out circuitry.

Figure 2:
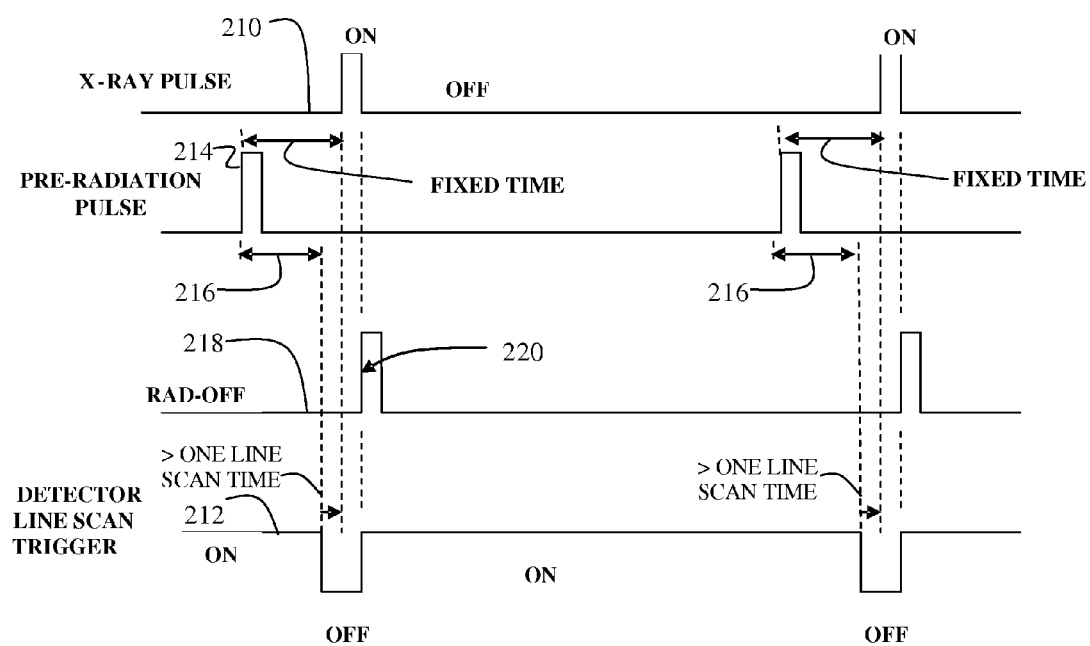
FIG. 2 is a signal diagram of the input and output control traces for the detector frame scan signal generator.

FIG. 2 shows an exemplary timing diagram for the present system and the dependency of the DLST on three trigger inputs from the X-ray source (Pre-radiation pulse, X-ray radiation pulse, and radiation off-pulse ("Rad-off"). Before the X-ray pulse, trace 210, goes high turning the beam on, DLST, trace 212, is high and detector reads scan lines sequentially. The pre radiation-on pulse, trace 214, is activated before the start of radiation by the signal generator providing a fixed time prior to the initiation of the x-ray radiation. A timed delay 216 from pre-radiation pulse generated within the frame control scan generator turns DLST off at least one line scan time before X-ray radiation pulse goes on (when the actual X-ray radiation is activated). When DLST goes off, the detector will not read the next scan line and will wait until DLST goes high again. After delivering of radiation beam, the Rad-off signal, trace 218, is activated by the signal generator and upon receiving the rising edge 220 of the Rad-off pulse the control scan generator switches the DLST to the on status and detector continues reading scan lines again until the delivery of the next radiation pulse.

As an example using the embodiment shown, the X-ray pulsing frequency is 250 pulses per second and the detector fastest frame rate is 30 frames per second (a frame time of 33.3 ms). The detector reads 512 scan lines during a frame and this correspond to a line readout time of 66 µs (ignoring frame delay time). DLST goes off 66 µs before the start of radiation. After delivery of a radiation pulse, DLST goes on and detector reads nearly 60 lines before the start of the next radiation pulse. The frame overhead due to the wait time during radiation time is about 8 to 9 scan line readout time or 0.528 ms to 0.594 ms. Therefore, the fastest frame rate for this example will be 29.5 fps (just under 33.9 ms per frame).

To make the frame scan time adaptive to the x-ray pulsing period and also adaptive for jittering/variation of pulsing period, a programmable delay can be added at the end of the detector line scanning (after scanning the last line). This programmable delay assures that the frame time will be fixed and this eases the requirements for calibration or offset of the acquired frames. In some embodiments, detector firmware in the analysis system computes the time from start of frame to the end of the last scan line and subtracts this time from the frame time that has been programmed or selected. The result of this subtraction is the frame delay time. For instance, in above example, if the frame time is programmed to be 35 ms and the time from start of frame to the end of the last scan line is assumed to be 33.9 ms from the example as previously discussed, the programmable delay set at 35−33.9=1.1 ms.

Additional control signal generation for various operating modes of the X-ray system are also accommodated through the control scan generator. If the detector is in a different acquisition mode such as free running mode, at least one frame (not shown to scale) before the start of radiation, the detector should be switched to the triggered line scan mode. This can be done either by user, analysis system, or internal control signals from the X-ray source can be used to flag this event and do this mode switching. When a user or an imaging system requests a radiation exposure, pre-radiation control signals like "prep" (prepare) for KV x-ray systems or "HV-on" (High voltage on) for MV X-ray system are activated and indicate that the x-ray exposure is imminent. These signals can be used for switching the frame scan mode as described above.

Figure 3:
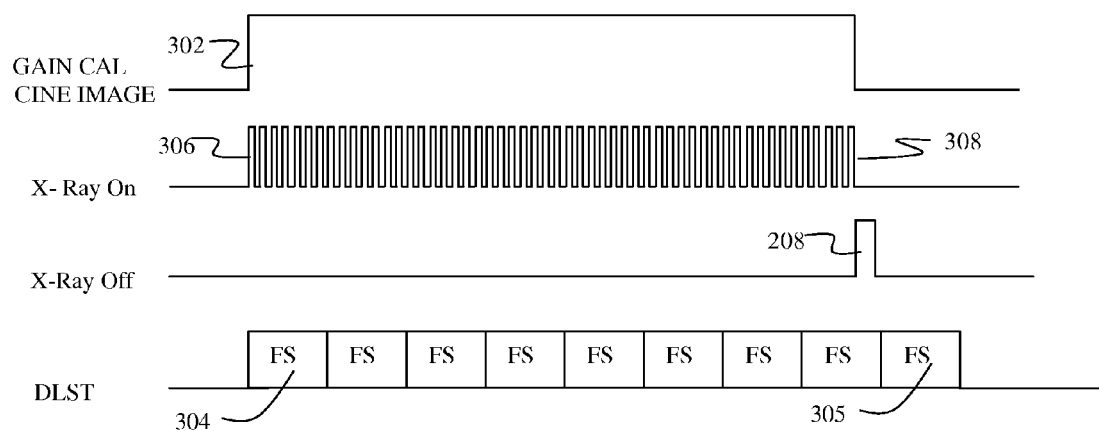
FIG. 3 is a signal diagram of control signals for gain calibration.

The present invention is integrated additionally with continuous radiation modes such as Gain calibration and Cine imaging. With reference to FIG. 3, all frame scans 304, from the beginning of radiation at rising edge 306 to the end of radiation at falling edge 308, plus a post-frame 305 after receipt of the X-ray off pulse 208 denoting the elapse of radiation are used for Gain correction by the analysis system. Similarly for Cine imaging, all frames from the beginning of radiation to the end of radiation plus a post-frame 305 after elapse of radiation are used by the analysis system.

Figure 4:
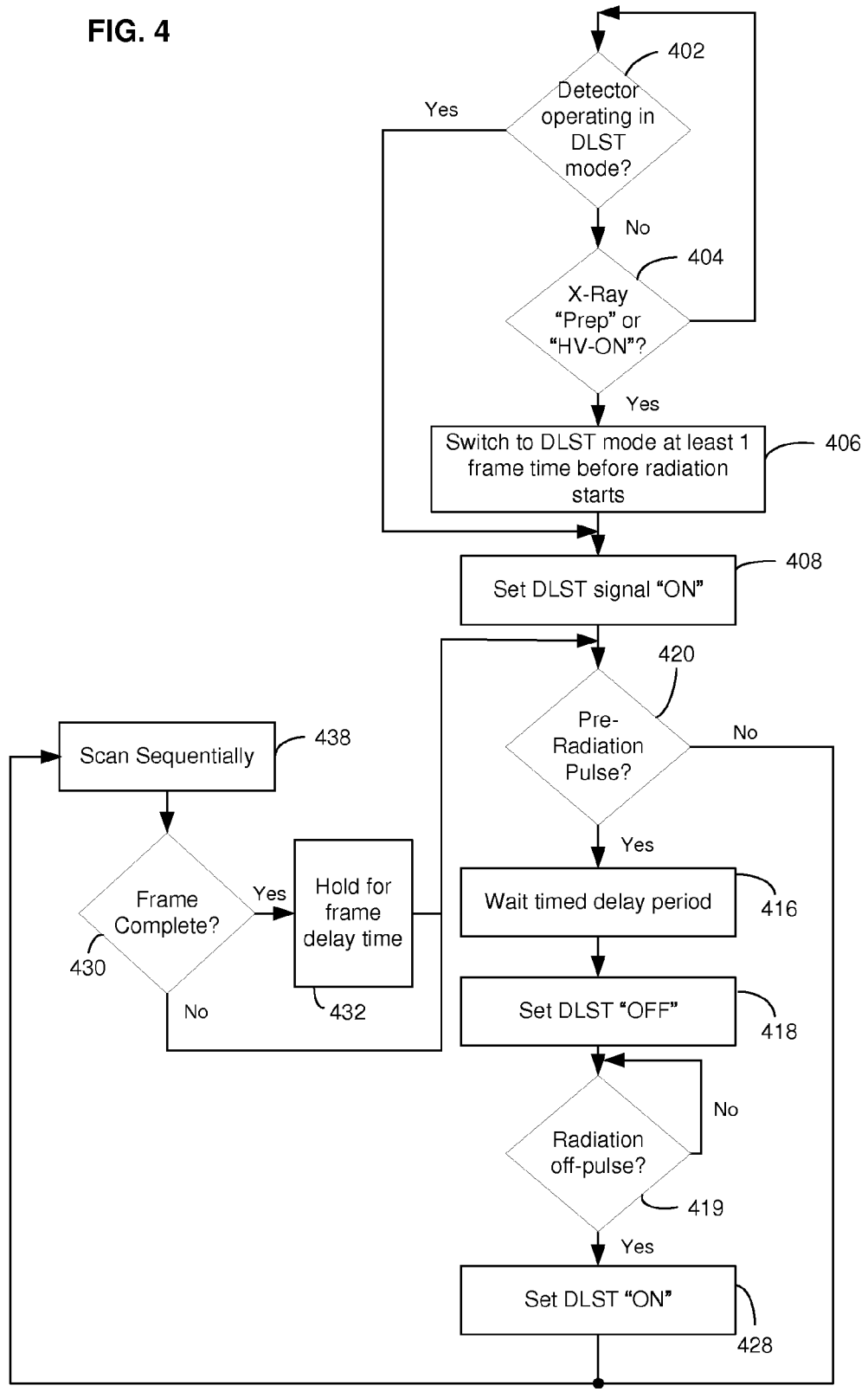
FIG. 4 is a flow diagram of the method for detector scan control employing the present invention; and, FIG. 5 is a flow diagram of the method for detector scan control including gain calibration and Cine imaging.

FIG. 4 provides one exemplary flow chart for system operation according to the present invention. If the detector is operating in an acquisition mode other than DLST mode 402, then a request for an X-ray exposure will activate X-ray "prep" or "HV-on" signal 404 and result in the acquisition mode switching to DLST mode at least one frame prior to the commencement of radiation, 406. In pulsed radiation imaging mode, the scan control generator sets the DLST signal to "on" 408. Upon receipt of an asserted Pre-radiation pulse signal from the signal generator 420, a timer is set to wait for a fixed timed delay period 416. The fixed timed delay period is equal to the time between the rising edges of the X-ray radiation pulse and the Pre-radiation pulse minus at least one line scan time. After the timed delay period, the DLST signal is turned "off" 418 at a point in time substantially equivalent to one line scan time before the X-ray radiation pulse turns on. While the DLST signal is "off", the detector will not read the next scan line and instead will wait until the DLST signal goes "on" again before resuming reading. After delivery of the radiation beam, the Rad-off signal is activated by the signal generator. Upon receiving the rising edge of the Rad-off pulse 419, the control scan generator switches the DLST to the "on" status 428, and the detector continues reading scan lines again 438 until the delivery of the next radiation pulse. Upon completion of a frame 430, scanning may be suspended for a frame delay time which is programmed or selected to accommodate jitter 432. Thereafter, the scan control generator returns to the scanning operation at step 420.

Figure 5:
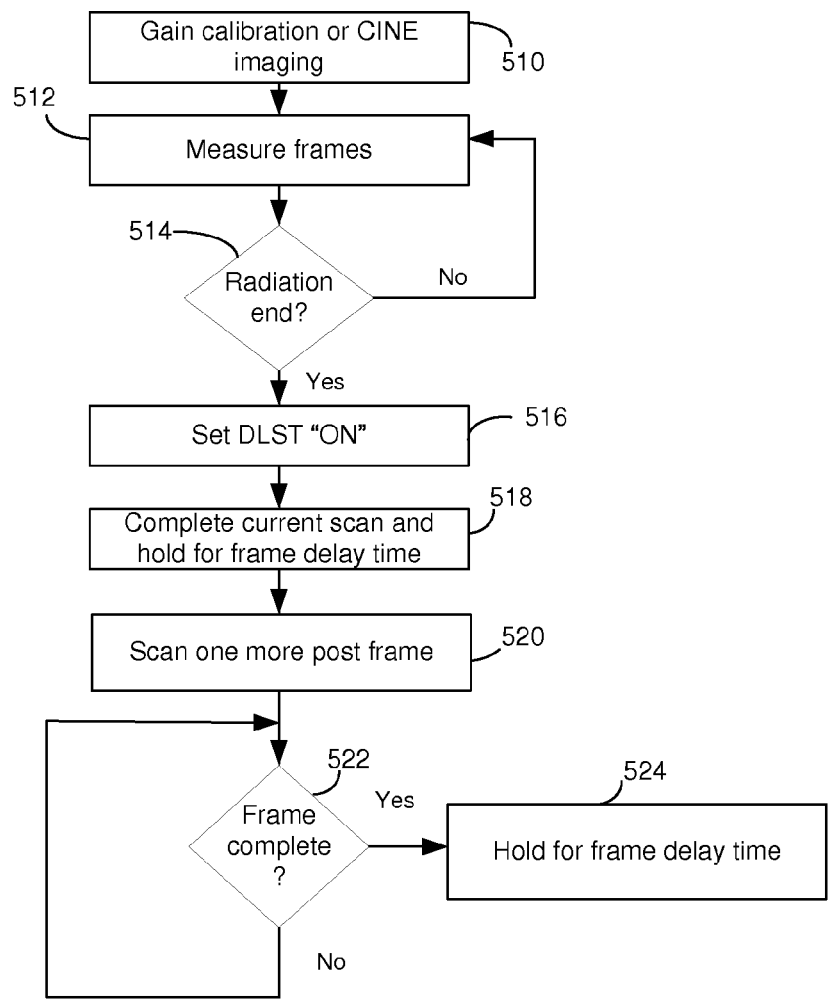

As shown in FIG. 5, if a continuous imaging mode as described with respect to FIG. 3 such as gain calibration or Cine imaging is activated 510, detector scans for each frame are performed as detailed in FIG. 4. Upon the completion of radiation, the X-ray off signal is activated. This causes the DLST signal to stay "on" 516 to complete the frame in which the radiation elapsed during the scan 518, plus one more frame 520 following the elapse of radiation. The frame delay time is also applied to these frames.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. A method for adaptive frame scanning for pulsed X-ray imaging of X-ray radiation delivered in a sequence of pulses having an X-ray pulsing period, the method comprising the steps of:
    scanning lines on an image detector sequentially, wherein the lines on the image detector are scanned in a frame scan time, and wherein the frame scan time is longer than the X-ray pulsing period;
    receiving an indication that the radiation is about to begin;
    waiting a fixed delay after the indication that the radiation is about to begin is received;
    suspending scanning lines on the image detector after the fixed delay has lapsed, wherein scanning lines on the image detector is suspended before the radiation begins;
    resuming scanning lines on the image detector upon receiving an indication that the radiation has stopped.

2. The method of claim 1, wherein the step of waiting a fixed delay comprises waiting until at least one scan line time prior to receiving an indication that radiation has begun.

3. The method of claim 1 further comprising:
    monitoring for completion of a frame; and,
    adding a predetermined frame delay upon completion of a frame before commencing the next line scan.

4. The method of claim 3 wherein the predetermined frame delay is calculated to accommodate jitter in actual radiation-on times to obtain a fixed frame rate.

5. The method of claim 1 further comprising:
    sensing gain calibration;
    employing frame scans from the beginning of radiation to the end of radiation plus a post frame after elapse of radiation gain correction by an analysis system.

6. The method of claim 1 further comprising:
    sensing Cine imaging;
    employing frame scans from the beginning of radiation to the end of radiation plus a post-frame after elapse of radiation gain for image generation.

7. The method of claim 1 further comprising:
    operating the detector in an alternate mode;
    monitoring switching of the X-ray source from standby to "on" mode; and
    resetting the control scan generator to stop line scanning at least one frame prior to the delay from the indication that radiation is about to begin.

8. The method of claim 7 in which the on mode is determined by the control scan generator responsive to a flag from the X-ray generator that radiation is imminent.

9. A system for control of an X-ray image detector comprising:
    an x-ray source;
    a signal generator connected to the X-ray source and capable of providing a first signal indicating that radiation is about to begin and a second signal that radiation has stopped;
    a detector frame scan signal generator capable of receiving the first and second signals from the signal generator, waiting a delay responsive to the first signal, providing a first control signal to suspend line scanning responsive to the delay, and providing a second control signal to activate line scanning responsive to the second signal from the signal generator.

10. The system of claim 9 wherein the detector frame scan signal generator provides a control signal to suspend line scanning substantially equal to at least one scan line time prior to receiving an indication that radiation has begun.

11. The system of claim 9 wherein the detector frame scan signal generator is capable of monitoring for completion of a frame and provide a third control signal to activate line scanning for adding a predetermined frame delay upon completion of a frame before commencing the next line scan.

12. The system as defined in claim 11 wherein the predetermined frame delay is calculated to accommodate jitter in actual radiation on times to obtain a fixed frame rate.

13. The system as defined in claim 9 wherein the X-ray image detector is capable of operating in an alternate mode and the detector frame scan signal generator is further capable of monitoring switching of the X-ray source from standby to "on" mode; and resetting to stop line scanning at least one frame prior to the delay from the pre-radiation on pulse.

14. The system as defined in claim 13 in which the on mode is determined by the detector scan signal generator responsive to an active signal generated by the signal generator associated with the X-ray source.

15. A method of scanning an imaging array used to convert incident X-rays into electrical signals, wherein the X-rays are delivered in a sequence of pulses, and wherein a warning signal is generated at a first time interval prior to the delivery of each X-ray pulse, said method comprising the steps of:
    (a) initiating the scanning of the array at the end of an X-ray pulse;
    (b) upon detection of the warning signal, continuing the scanning of the array for a second time interval shorter than said first interval and then halting the scanning of the array; and
    (c) repeating steps (a) and (b).

16. A method as recited in claim 15, wherein the second time interval is selected so that time between the end of the second time interval and the end of the first time interval is about equal to the time it takes to scan one line of the imaging array.

* * * * *